United States Patent
Liston et al.

(10) Patent No.: US 9,760,517 B2
(45) Date of Patent: Sep. 12, 2017

(54) NETWORK-USB (NUSB) COMMUNICATION SYSTEM BY WHICH NETWORK APPLICATIONS COMMUNICATE WITH USB DEVICES OVER POWER-OVER-ETHERNET (POE) CONNECTION

(71) Applicant: Cisco Technology, Inc., San Jose, CA (US)

(72) Inventors: Rob Liston, Menlo Park, CA (US); Koussalya Balasubramanian, Santa Clara, CA (US); Naoshad Mehta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 14/558,119

(22) Filed: Dec. 2, 2014

(65) Prior Publication Data

US 2015/0331821 A1 Nov. 19, 2015

Related U.S. Application Data

(60) Provisional application No. 61/994,205, filed on May 16, 2014.

(51) Int. Cl.
*G06F 13/00* (2006.01)
*G06F 13/38* (2006.01)
(Continued)

(52) U.S. Cl.
CPC ............. *G06F 13/387* (2013.01); *G06F 1/26* (2013.01); *G06F 1/266* (2013.01); *G06F 13/42* (2013.01);
(Continued)

(58) Field of Classification Search
CPC ...... G06F 1/3209; G06F 13/387; G06F 1/266; G06F 2213/0042; G06F 13/42; H04L 69/08; H04L 12/10
(Continued)

(56) References Cited

U.S. PATENT DOCUMENTS

| | | | |
|---|---|---|---|
| 7,886,165 B2 * | 2/2011 | Khan | G06F 1/3209 713/300 |
| 7,966,502 B2 | 6/2011 | Diab et al. | |

(Continued)

OTHER PUBLICATIONS

USB/IP Project, "USB Request Over IP Network," Dec. 27, 2011, http://web.archive.org/web/20111227171215/http://sourceforge. net/.*

(Continued)

*Primary Examiner* — Tammara Peyton
(74) *Attorney, Agent, or Firm* — Edell, Shaprio & Finnan, LLC

(57) ABSTRACT

A network device includes Power-over-Ethernet PoE ports to communicate with a communication network and Universal Serial Bus (USB) devices. The network device establishes an Internet Protocol (IP) related connection with an application program, and receives downlink IP packets carrying USB transaction requests destined for the USB device from the application program over the IP connection. The network device converts the received downlink IP packets carrying the USB transaction requests to downlink bus-level USB transactions that are understandable to the USB device. The network device sends the downlink bus-level USB transactions to the USB adaptor device over a PoE connection for forwarding by the USB adaptor device to the USB device.

24 Claims, 7 Drawing Sheets

(51) Int. Cl.
*G06F 1/26* (2006.01)
*G06F 13/42* (2006.01)
*H04L 12/10* (2006.01)
*H04L 29/06* (2006.01)

(52) U.S. Cl.
CPC .......... *G06F 13/4282* (2013.01); *H04L 12/10* (2013.01); *G06F 2213/0042* (2013.01); *H04L 69/08* (2013.01)

(58) Field of Classification Search
USPC .................................................. 710/308–310
See application file for complete search history.

(56) References Cited

U.S. PATENT DOCUMENTS

| | | |
|---|---|---|
| 8,661,268 B2 | 2/2014 | Brooks et al. |
| 2001/0047441 A1 | 11/2001 | Robertson |
| 2003/0172312 A1 | 9/2003 | Takahashi et al. |
| 2006/0129690 A1* | 6/2006 | Hill ........................ H04L 67/02 709/230 |
| 2007/0121832 A1 | 5/2007 | Ghoshal |
| 2007/0255868 A1 | 11/2007 | Chahal et al. |
| 2009/0248918 A1 | 10/2009 | Diab et al. |
| 2009/0265057 A1 | 10/2009 | Chinnadurai et al. |
| 2010/0007473 A1 | 1/2010 | Fadell |
| 2010/0030925 A1 | 2/2010 | Inoue |
| 2010/0036992 A1 | 2/2010 | Sisto et al. |
| 2013/0301301 A1 | 11/2013 | Fischer |
| 2015/0311753 A1 | 10/2015 | Scifres |
| 2015/0331464 A1* | 11/2015 | Balasubramanian . G06F 13/387 713/310 |
| 2016/0366162 A1* | 12/2016 | Herzel ................... G01R 27/16 |

OTHER PUBLICATIONS

"USB/IP: A Transparent Device Sharing Technology over IP Network" Takahiro Hirofuchi et al. Sep. 2005.*

Maheshwari, "Hula: An Efficient Protocol for Reliable Delivery of Messages", Technical Report MIT-LCS-TR-720, Jul. 1997, 9 pages.

* cited by examiner

NETWORK-USB (NUSB) COMMUNICATION SYSTEM BY WHICH NETWORK APPLICATIONS COMMUNICATE WITH USB DEVICES OVER POWER-OVER-ETHERNET (POE) CONNECTION

CROSS REFERENCE TO RELATED APPLICATION

This application claims priority to U.S. Provisional Application No. 61/994,205 filed May 16, 2014, the entirety of which is incorporated herein by reference.

TECHNICAL FIELD

The present disclosure relates to techniques for interfacing network applications to Universal Serial Bus (USB) devices over Ethernet connections.

BACKGROUND

A network-based client device or an application program may attempt to communicate with a Universal Serial Bus (USB) device across both a standard USB connection and a standard Ethernet connection. USB communication over a USB connection uses a packet based protocol that assumes reliable transport and has tight timing requirements. On the other hand, Ethernet communication over an Ethernet connection may incur packet drops or delay in the presence of congestion. Thus, the USB and Ethernet communications have disparate transport and timing requirements that can complicate a scheme that combines communication across both types of mediums.

DESCRIPTION OF EXAMPLE EMBODIMENTS

Overview

Techniques presented herein relate to interfacing network-based program applications to Universal Serial Bus (USB) devices over networks and Power-over-Ethernet (PoE) connections. In an embodiment, a network device enables an application program to communicate with a USB device through a Network-USB (NUSB) adaptor device having (i) a Power-over-Ethernet (PoE) connection to a PoE port of the network device, and (ii) a USB connection to the USB device. The network device establishes an Internet Protocol (IP) connection (e.g., a Transmission Control Protocol/IP (TCP/IP) connection) with the application program and receives downlink IP packets (e.g., TCP/IP packets) carrying USB transaction requests destined for the USB device from the application program over the IP connection. The network device converts the received downlink IP packets carrying the USB transaction requests to downlink bus-level USB transactions that are understandable to (i.e., can be processed by) the USB device, and sends the downlink bus-level USB transactions to the USB adaptor device over the PoE connection. The NUSB adaptor forwards the bus-level USB transactions received thereby to the USB device over the USB connection.

Example Embodiments

Figure 1:
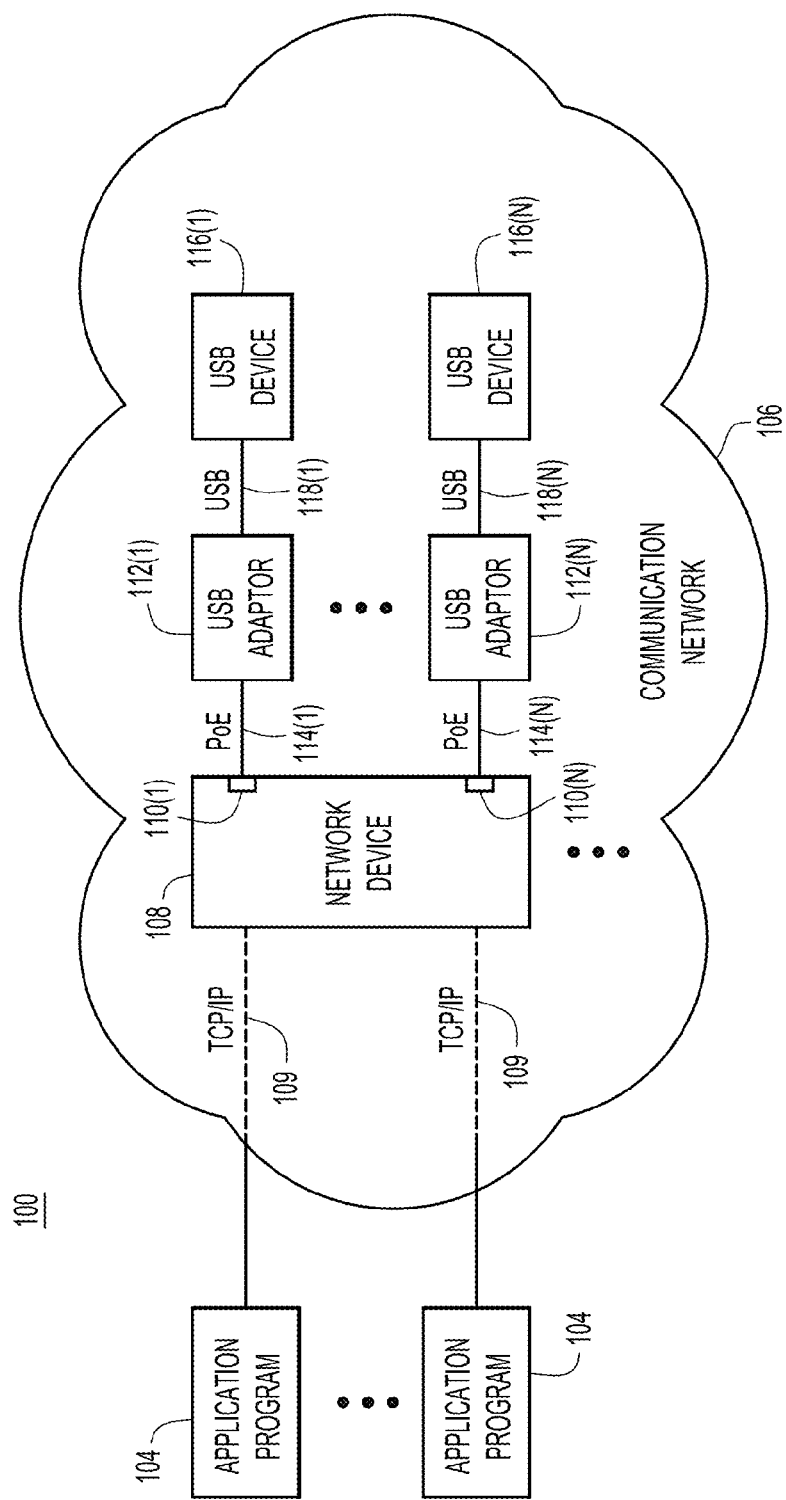
FIG. 1 is shown a diagram of an example communication network environment in which techniques to interface network-based program applications and/or client devices to Universal Serial Bus (USB) devices over a network and a Power-over-Ethernet (PoE) connection may be implemented, according to an example embodiment.

Referring first to FIG. 1, there is shown a diagram of an example communication network environment 100 in which techniques presented herein to interface network-based program applications to USB devices over a network and a PoE connection may be implemented. Environment 100 includes multiple application programs 104 (also referred to individually as an application program 104) that communicate with a communication network 106, which may include one or more wide area networks (WANs), such as the Internet, and one or more local area networks (LANs). Communication network 106 also includes multiple PoE-enabled network devices 108, only one of which is shown in FIG. 1, such as network routers and switches. Application programs 104 may communicate with network device 108 over respective Transmission Control Protocol (TCP)/Internet Protocol (IP) connections 109, although other connection/IP communication protocols may be used. Network device 108 includes PoE enabled network ports 110(1)-110(N) connected to Network-Universal Serial Bus (USB) (NUSB) adaptor devices 112(1)-112(N) over PoE connections 114(1)-114(N), respectively. NUSB adaptor devices 112(1)-112(N) (referred to simply as NUSB devices 112) are in turn connected to USB devices 116(1)-116(N) over USB connections 118(1)-118(N) (including standard USB connectors and cables), respectively. PoE network ports 110 power NUSB adaptors 112, which in turn power USB devices 116. NUSB devices 118, USB devices 112, and USB connections 118 are configured to operate in accordance with known and hereafter developed USB standards such as, but not limited to, USB 1.0, 2.x, and 3.x.

Application program 104 may be hosted in a physical machine, a virtual machine, or network device 108, in which case the network device may also host USB driver (e.g., libusbx), networking, and operating system services. Application program 104 may be an end user application, such as a building control system, or middleware, which aggregates and exposes data through an Application Program Interface (API). Application program 104 may also exist in a client or user device. Application program 104 may operate as an Internet-of-Things (IOT) application that communicates bi-directionally with USB devices 116 to control and collect data from the devices, which may include physical sensors, actuators, radios (including radio frequency (RF) tags), controllable lights, switches, or other types of remote controllers, for example.

Application program 104 may write data to USB devices 116, read data from the USB devices, or otherwise control the USB devices. To perform such reads, writes, and control, application program 104 communicates with a given USB device 116($i$) through/over TCP/IP connection 109, network device 108, PoE Ethernet connection 114($i$), NUSB adaptor 112($i$), and USB connection 118($i$). The end-to-end communication between application program 104 and any of USB devices 116 is referred to as "network-USB (NUSB) communication" and is supported by an NUSB system or architecture described below in connection with FIG. 2. The NUSB system or architecture provides advantages in terms of cost, power, manageability and security.

Figure 2:
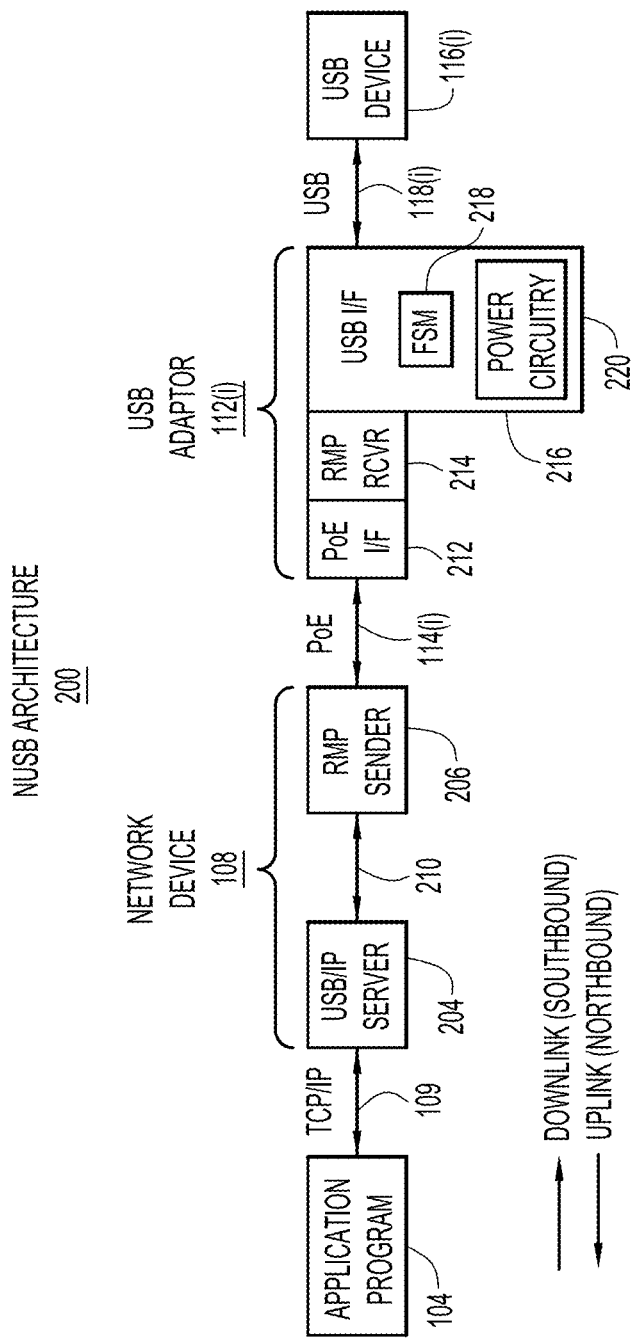
FIG. 2 is a block diagram of an example Network-USB (NUSB) system or architecture for implementing end-to-end communication between an application program and a USB device from FIG. 1 using an NUSB protocol, according to an example embodiment.

With reference to FIG. 2, there is depicted an example NUSB architecture 200 for implementing the above-mentioned end-to-end NUSB communication between application program 104 and a given USB device 116($i$) using an NUSB protocol, which combines multiple other protocols, including an Ethernet protocol, a Reliable Message Protocol (RMP), and a bus-level USB transaction protocol, as will be described below. Network device 108 includes a USB/IP server 204 to implement a USB/IP protocol over TCP/IP connection 109, and an RMP Sender 206 to implement a sender-side of an RMP over PoE connection 114($i$). NUSB adaptor 112($i$) includes a PoE interface (I/F) 212 connected to network device PoE port 110($i$) over Ethernet connection 114($i$), an RMP Receiver 214 that implements a receiver-side of the RMP, and a USB interface 216 to connect with USB device 116($i$) over USB bus 118($i$). USB interface 216 includes a USB Finite State Machine 218 to convert between RMP and bus-level USB protocols, and power circuitry 220 to convert PoE power/voltage to USB power/voltage to power USB device 116($i$).

NUSB adaptors 116 enable various advantageous features of NUSB architecture 200. A first feature of NUSB architecture 200 is to transform PoE-enabled network device 108 into an application platform able to control and power remote USB devices 116. To this end, network device 108 communicates over low power, low cost RJ-45 ports (110) to NUSB adaptors 112 using standard Ethernet over Cat-5 cable up to 100 meters, for example. In an embodiment, NUSB adaptors 112 may be PoE/Universal PoE (UPoE) powered and in turn may deliver up to, e.g., 60 watts, to USB devices 116 over standard USB connectors and cables. In another embodiment, NUSB adaptors 112 may supply standard 5V USB power to USB devices 116. An advantage of using NUSB adaptors 116 is that IoT endpoints, e.g., USB devices 116, may be low power and low cost devices that include a limited microcontroller with an industry standard USB interface. Another advantage is that network device 108 may act as an IoT gateway and may, therefore, directly enforce security policy with respect to communications with USB devices 116.

Another feature of NUSB architecture 200 is to provide reliable communication across both PoE connections 114 and USB connections 118. USB communication uses a packet based protocol that assumes reliable transport and has tight timing requirements. Ethernet communication is also packet based but may incur packet drops or delay in the presence of congestion. NUSB adaptors 112 implement an RMP handshake-based protocol on the Ethernet sides of the NUSB adaptors to generate reliable request/response transactions. These transactions subsequently drive bus-level USB transaction sequences, such as "SETUP," "IN" and "OUT" transaction sequences. Also, on network device 108, all packets exchanged through "USB-mode" configured network ports 110 may punt/inject to a software process that executes on the network device and implements a USB host controller driver and USB/IP server 204 (as will be described below).

Another feature of NUSB architecture 200 is delivery of full Universal PoE (UPoE) power over USB connections 118. The USB standards body has developed a power delivery specification called "USB Powered Device (PD)," which can negotiate and deliver up to 100 watts using a standard-A USB connector. NUSB adaptors 116 implement a technique to interwork Ethernet UPoE and USB PD so that USB devices 116 can use an industry standard interface for both control and power. In an embodiment, NUSB adaptors 116 implements a Class 2 802.3af PoE PD interface to supply standard 5 Volt USB power to USB devices 116.

At a high-level, NUSB adaptor 112($i$) includes a minimum amount of circuitry required to expose USB functionality (e.g., USB 2.0 functionality) over Ethernet. A given NUSB adaptor 112($i$) operates as a stateless slave device that provides a medium through which network device 108 communicates with USB device 116($i$) over Ethernet in a manner that requires only layer 2 network connectivity. NUSB adaptor 112($i$) also represents a partitioning of USB Host Controller Driver (HCD) functionality between an end station (e.g., USB device 116($i$)) and a host, that includes:

a. Performing Start-of-Frame (SOF) framing in the end station;
b. Performing TOKEN-DATA-HANDSHAKE atomic transactions in the end station;
c. Utilizing a reliable messaging protocol between the host and end station;
d. Not requiring a persistent state in the end station; and
e. Requiring only minimal hardware in the end station.

Regarding end-to-end communications in NUSB architecture 200, application program 104 sends USB device-related messages destined for USB device 116($i$) in a downlink or southbound direction (i.e., left-to-right in FIG. 2) and the USB device sends USB device-related messages to the application program in an uplink or northbound direction (i.e., right-to-left in FIG. 2). More specifically, application program 104 and USB/IP server 204 exchange USB/IP messages that encapsulate USB transactions with each other over TCP/IP connection 109 using a USB/IP protocol. The USB/IP messages are carried in TCP/IP packets and, therefore, may also be referred to as TCP/IP packets. USB/IP server 204 converts between USB transactions encapsulated in the USB/IP messages and bus-level USB transactions 210 (also referred to as atomic transactions 210) that are understandable to/by USB device 116($i$) (e.g., are defined in a USB standard). RMP Sender 206 of network device 108 and RMP Receiver 214 of NUSB adaptor 112($i$) exchange RMP messages that encapsulate the bus-level USB transactions over PoE connection 114($i$). USB FSM 218 converts between the RMP messages and bus-level USB transactions, and exchanges the bus-level USB transactions as a bus-level USB transaction sequence with USB device 116($i$).

Figure 3A:
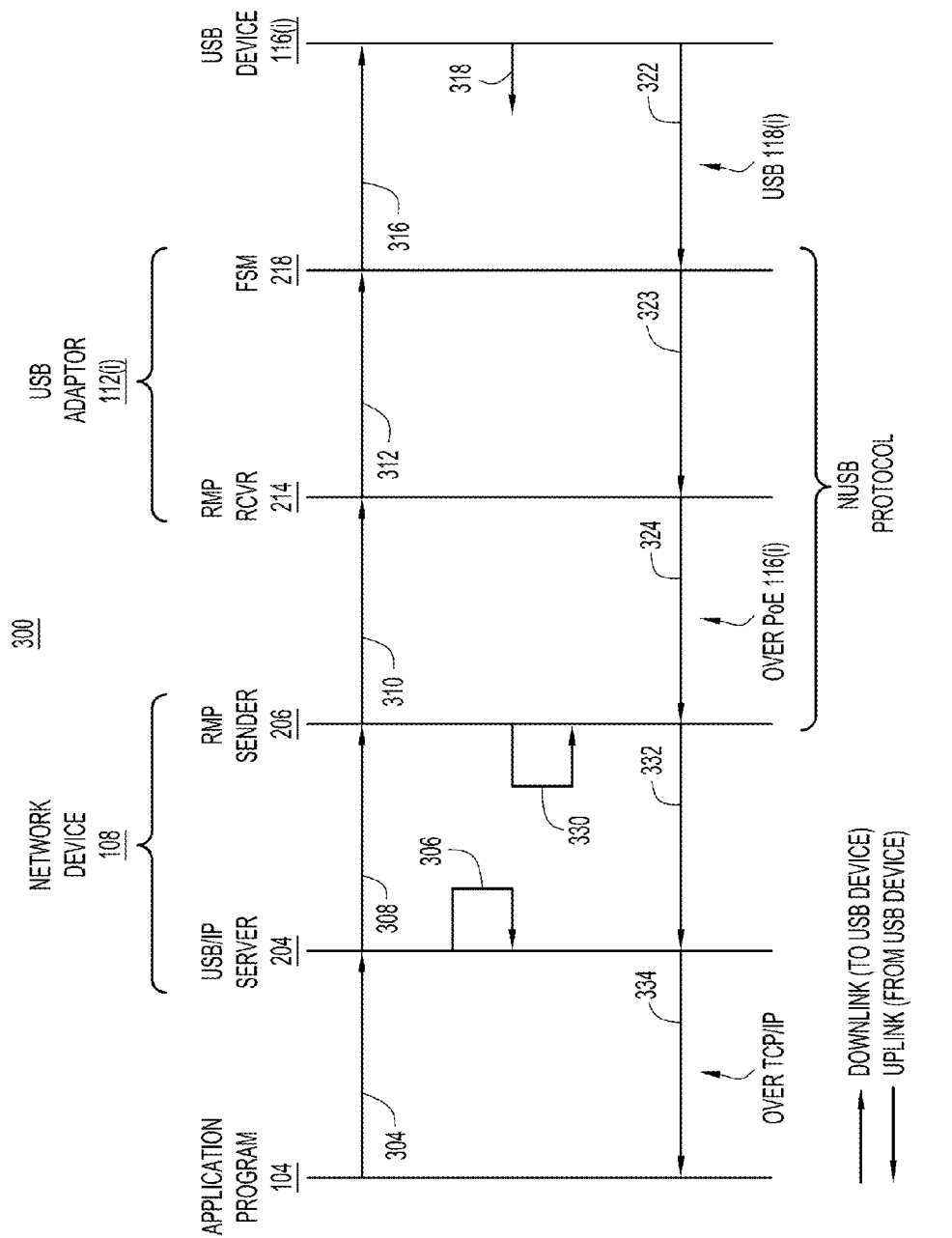
FIG. 3A is an illustration of example downlink and uplink message flows in the NUSB architecture of FIG. 2, according to an example embodiment.

With reference to FIG. 3A, there is an illustration of example downlink and uplink message flows 300 in NUSB architecture 200. Initially, (i) NUSB adaptor 112($i$) advertises its identity to network device 108 using, for example, the Link Layer Data Protocol (LLDP) to enable the network device to enumerate remote USB connection 118(*i*), (ii) application program 104 and the network device establish TCP/IP connection 109, and (iii) the application program queries for, identifies, and attaches/connects logically to USB device 116(*i*).

The downlink message flow is described first.

At 304, client device 104 sends USB/IP messages (TCP/IP packets) that encapsulate USB transaction requests destined for USB device 116(*i*), to USB/IP server 204 over TCP/IP connection 109 using the USB/IP protocol. The USB transaction requests include, for example, USB read, USB write, and USB control requests.

At 306, USB/IP server 204 receives the USB/IP messages, extracts the USB transaction requests from the received USB/IP messages (i.e., unwraps the received USB/IP messages), and converts each extracted USB transaction request to one or more corresponding "atomic" bus-level USB transactions that are understandable to the USB device. Typically, the bus-level USB transactions include token (e.g., "IN," "OUT," and "SETUP"), data, handshake (e.g., "ACK" and "NACK"), and special (e.g., "SPLIT" and "PING") packets defined according to a USB standard. A single USB transaction may be composed of multiple bus-level USB transactions, for example, due to USB NAK retries or USB device maximum data transfer size limitations.

At 308, USB/IP server 204 sends the bus-level USB transactions to RMP Sender 206.

At 310, RMP Sender 206 sends each bus-level USB transaction received from USB/IP server 204 to RMP Receiver 214 over PoE connection 114(*i*) using RMP, i.e., RMP communication transport overlays PoE communication transport on PoE connection 114(*i*). To do this, RMP Sender 206 encapsulates each bus-level USB transaction in an RMP message and sends the RMP message to RMP Receiver 214 using a multi-message RMP handshake, described below in connection with FIG. 4.

The communication transport between network device 108 and NUSB adaptor 112(*i*) over PoE connection 114(*i*), without the benefit of the RMP overlay, is at network layer 2, which is relatively unreliable and may incur a relatively high latency. In contrast, communication transport over USB connection 118(*i*) is assumed to be relatively reliable and to have relatively low latency. Thus, there is a mismatch in communication transport conditions between PoE connection 114(*i*) (without RMP) and USB connection 118(*i*). Accordingly, the RMP overlay raises the transport reliability and encapsulates latency-critical operation (to help lower the latency) over PoE connection 118(*i*) so as to better match the transport reliability and latency requirements of USB connection 118(*i*).

RMP Receiver 214 unwraps the bus-level USB transactions from the RMP messages received from RMP Sender 206, and at 312 provides the bus-level USB transactions to USB FSB 218 over a Receiver-FSM interface using a Receiver-FSM protocol.

USB connection 118(*i*) has relatively strict/tight timing requirements imposed thereon for the bus-level USB transaction sequence including token, data, handshake, and special packets exchanged over the USB connection. USB FSM 218 implements the USB transaction sequence, in both the downlink or transmit direction and in the uplink or receive direction, so as to comply with such tight timing requirements. USB FSM 218 generates the bus-level USB transaction sequence from the bus-level USB transactions from RMP receiver 214.

At 316, USB FSM 218 sends the bus-level USB transaction sequence to USB device 116(*i*) over USB connection 118(*i*).

At 318, in response to the bus-level USB transaction sequence received over USB connection 118(*i*), USB device 116(*i*) returns an acknowledgement to NUSB adaptor 112(*i*) (i.e., to USB FSM 218). The acknowledgement is forwarded back to application program 104.

The uplink message flow is now described.

At 322, USB device 116(*i*) transmits and USB interface 216 (i.e., USB FSM 218) of NUSB adaptor 112(*i*) receives a bus-level USB transaction sequence.

At 323, USB FSM 218 recovers bus-level USB transactions from the sequence and provides the recovered bus-level USB transactions to RMP Receiver 214 over the Receiver-FSM interface.

At 324, RMP Receiver 214 sends each received bus-level USB transaction to RMP Sender 206 over PoE connection 114(*i*) using RMP. To do this, RMP Receiver 214 encapsulates each bus-level USB transaction in an RMP message and sends the RMP message to RMP Sender 206 using a multi-message RMP handshake.

At 330, RMP Sender 206 unwraps the bus-level USB transactions from the RMP messages received from RMP Receiver 214.

At 332, RMP Sender 206 sends the unwrapped bus-level USB transactions to USB/IP server 204.

At 334, USB/IP server 204 sends the bus-level USB transactions to application program 104 using the USB/IP protocol. To do this, USB/IP server 204 wraps the bus-level transactions into a USB/IP message and sends the message to application program 104 over TCP/IP connection 109.

As described above, RMP Sender 206 and RMP Receiver 214 implement RMP over PoE connection 114(*i*) to convey bus-level USB transactions between the RMP Sender and the Receiver, and USB FSM 218 converts between the bus-level USB transactions and USB transaction sequences exchanged over USB connection 118(*i*). As a result, RMP Sender 206, RMP receiver 214, and USB FSM 218 collectively implement a 3 layer protocol referred to as an NUSB protocol that operates across or is supported by NUSB adaptor 112(*i*). The 3 NUSB protocol layers include (i) a bus-level USB transaction layer (the innermost layer), (ii) an RMP multi-packet handshake layer (the middle layer), and (iii) a PoE layer (the outermost layer).

Components of the NUSB protocol are now described in connection with FIGS. 3B, 4, 5, and Table 1.

Figure 3B:
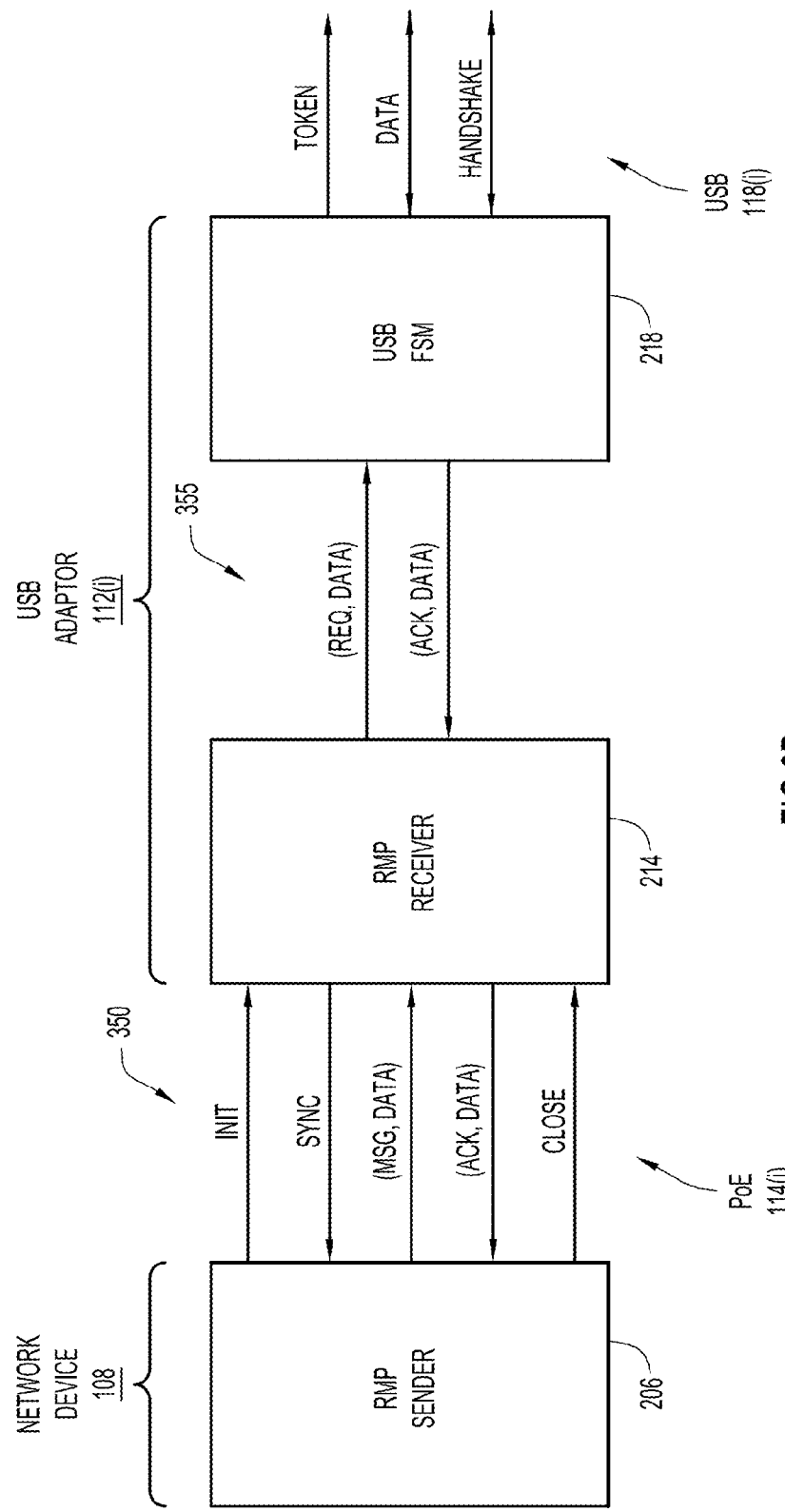
FIG. 3B is an illustration of a Reliable Message Protocol (RMP) Sender, an RMP Receiver, and a USB Finite State Machine (FSM), and messages exchanged between the Sender, Receiver, and USB FSM that are used to implement the NUSB protocol, according to an example embodiment.

With reference to FIG. 3B, there is an illustration of RMP Sender 206, RMP Receiver 214, and USB FSM 218, and messages exchanged by the RMP Sender, the RMP Receiver, and the USB FSM that are used to implement the NUSB protocol. RMP Sender 206 and RMP Receiver 214 exchange RMP handshake messages 350, including "init," "sync," "msg/data," "ack/data," and "close." RMP Receiver and FSM 218 exchange messages 355, including "req/data" and "ack/data."

The following summarizes features of RMP Sender 206, RMP Receiver 214, and FSM 218 with respect to the NUSB protocol:

a. Sender 206:
    i. Executes in a computer program thread on network device 108;
    ii. Includes an uplink interface facing application program 104 that exposes a USB transaction API to the application program;
    iii. May performs only one transaction at a time;

iv. Includes a downlink interface facing Receiver 214 that communicates with the Receiver using port-based Punject, for example;

v. Uses the downlink interface to perform a handshake protocol, described below in connection with FIG. 4; and vi. Encodes USB transactions in the handshake protocol "msg" and "ack" messages.

b. Receiver 214:

i. In one embodiment, may be implemented in hardware, e.g., in a field programmable gate array (FPGA), along with USB FSM 218; and ii. Terminates the handshake protocol and sends bus-level USB transactions, e.g., SETUP, OUT, and IN transactions, to the FSM.

c. USB FSM 218:

i. In one embodiment, may be implemented in the FPGA;

ii. Converts bus-level USB transactions, such as SETUP, OUT, and IN transactions, into low level USB packets of bus-level USB transactions sequences; and iii. Complies with tight USB timing, e.g., timing turn-around, requirements.

Figure 4:
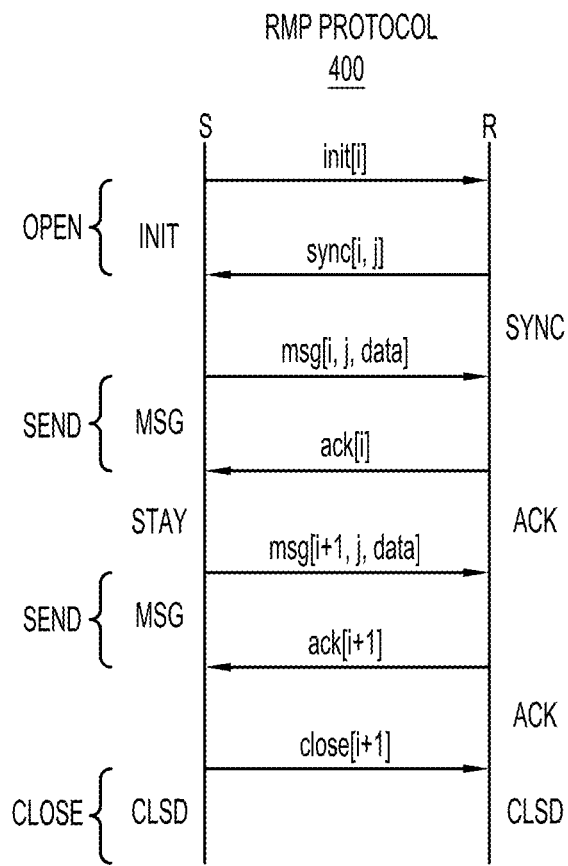
FIG. 4 is an illustration of example message transactions used to implement the RMP between the RMP Sender and Receiver based on messages depicted in FIG. 3B, according to an example embodiment.

With reference to FIG. 4, there is an illustration of an example message transaction diagram 400 used to implement the RMP between RMP Sender 206 (S) and RMP Receiver 214 (R) based on messages 350 from FIG. 3B. More specifically, transaction diagram 400 represents a reliable multi-packet (e.g., 5 packet) handshake using messages 350 to sequence the RMP through the following states: INIT to open an RMP connection using "init" and "sync"; MSG and STAY to send "msg" and "ack" over the open RMP connection that are encoded with the bus-level USB transactions; and CLSD to close the RMP connection using "close." In an example, the RMP is implemented substantially in accordance with the technical standard MIT-LCS-TR-720 extended to encode bus-level USB transactions into the data fields of "msg" and "ack."

To account for the 3 layers in the NUSB protocol, namely, bus-level USB transactions (the inner layer), the RMP multi-packet handshake (the middle layer), and the PoE layer (the outer layer), the NUSB protocol exchanges NUSB messages/packets across RMP Sender 206, RMP Receiver 214, and FSM 218 that account for the 3 layers, i.e., comply with an RMP message format that accounts for the 3 layers. The NUSB message format may be used in messages exchanged over PoE connection 114(i), and in messages 350 and 355, for example. Accordingly, the NUSB message format defines includes 3 message protocol sections/layers each corresponding to one of the 3 protocol layers, as described below in connection with FIG. 5.

Figure 5:
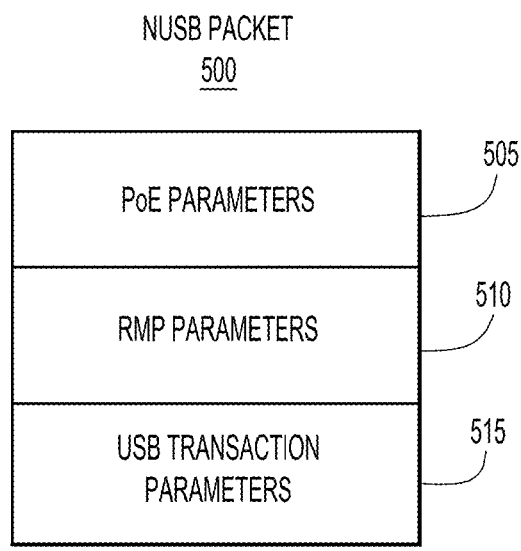
FIG. 5 is an illustration of an example NUSB (protocol) packet/message format to which NUSB packets/messages conform, according to an example embodiment.

With reference to FIG. 5, there is an illustration of an example NUSB (protocol) packet/message format 500 to which NUSB messages/packets conform. NUSB packet format 500 includes an outer layer 505 including fields for parameters related to PoE, a middle layer 510 including fields for parameters related to the RMP, and an inner layer 515 related to bus-level USB transactions.

Table 1 below is an example of an NUSB packet format that expands on NUSB packet format 500. Variations are possible. In the example of Table 1, the 3 Ethernet-related fields of the outer layer (505) relate to PoE and may be used to implement PoE. The 5 "dm" fields of the middle layer (510) relate to RMP and may be used by RMP (i.e., the multi-message handshake 400). The 13 "usb" fields of the inner layer relate to bus-level USB transactions. The USB transactions are communicated using a Request/Response protocol which runs on top of the multi-message handshake. The Request is encoded in the dmType==MSG packet and the Response is encoded in the dmType==ACK packet. As seen from Table 1, the USB transactions supported by USB FSM 218 include, but are not limited to:

DETECT( )={CONNECT}
RESET( )={LOW|FULL|HIGH}
SETUP(ADDR, DATA)={ACK|ERROR}
OUT(ADDR, DATA)={ACK|NAK|STALL|ERROR}
IN(ADDR)={ACK|NAK|STALL|ERR,DATA}
PING(ADDR)={ACK|NAK|STALL|ERROR}
SUSPEND( )
RESUME( )
(Note that Any request can return DISCONNECT|OVERCURRENT)

The SETUP, OUT and IN transactions have three variants for normal, split and preamble modes. Normal transactions are used to communicate directly with low, full and high speed devices. Split transactions are used to communicate with low and full speed devices via a high speed hub. Preamble transactions are used to communicate with low speed devices via a full speed hub.

TABLE 1

| Field name | Bits | Description |
| --- | --- | --- |
| destinationMac | 48 | 802.3 destination MAC address |
| sourceMac | 48 | 802.3 source MAC address |
| etherType | 16 | 802.3 ethertype, 0x88b5 for now |
| dmProto | 16 | The NUSB encapsulation protocol version, 0x0001 for USB 2.0 |
| dmType | 8 | 0x00 = INIT<br>0x01 = SYNC<br>0x02 = MSG<br>0x03 = ACK<br>0x04 = CLOSE |
| dmSendSeq | 16 | sender sequence number ("i") |
| dmRecvSeq | 16 | receiver sequence number ("j") |
| dmTimeout | 32 | 14 bit SYNC, ACK retry interval in 100us increments |
| usbRequest | 8 | 0x00 = OUT<br>0x01 = OUT_SSPLIT<br>0x02 = OUT_CSPLIT<br>0x03 = OUT_PRE<br>0x04 = IN<br>0x05 = IN_SSPLIT<br>0x06 = IN_CSPLIT<br>0x07 = IN_PRE<br>0x08 = SETUP<br>0x09 = SETUP_SSPLIT<br>0x0A = SETUP_CSPLIT<br>0x0B = SETUP_PRE<br>0x0C = PING<br>0x0D = RESET<br>0x0E = SUSPEND<br>0x0F = RESUME<br>0x10 = DETECT<br>0x11 = USB_OUT_ISOC<br>0x12 = USB_OUT_ISOC_SSPLIT<br>0x13 = USB_IN_ISOC<br>0x14 = USB_IN_ISOC_SSPLIT |
| usbResponse | 8 | 0x00 = ACK<br>0x01 = NAK<br>0x02 = STALL<br>0x03 = NYET<br>0x04 = ERROR<br>0x05 = LOW<br>0x06 = FULL<br>0x07 = HIGH<br>0x08 = DISCONNECT<br>0x09 = CONNECT<br>0x0A = OVERCURRENT |

TABLE 1-continued

| Field name | Bits | Description |
| --- | --- | --- |
| usbAddress | 8 | 7 bits |
| usbEndpoint | 8 | 4 bits |
| usbSplitHubAddr | 8 | 7 bits |
| usbSplitSC | 8 | 1 bit |
| usbSplitPort | 8 | 7 bits |
| usbSplitS | 8 | 1 bit |
| usbSplitE | 8 | 1 bit |
| usbSplitET | 8 | 2 bits |
| usbDataToggle | 1 | data toggle bit, set by host during OUT, device during IN |
| usbDataLength | 15 | number of valid bytes in usbData |
| usbData | 0 . . . 8192 | 0 . . . 1024 bytes of data |
| Padding | | pad to 64 byte minimum size frame |
| Frame Check Sequence (FCS) | 32 | IEEE 802.3 |

Figure 6:
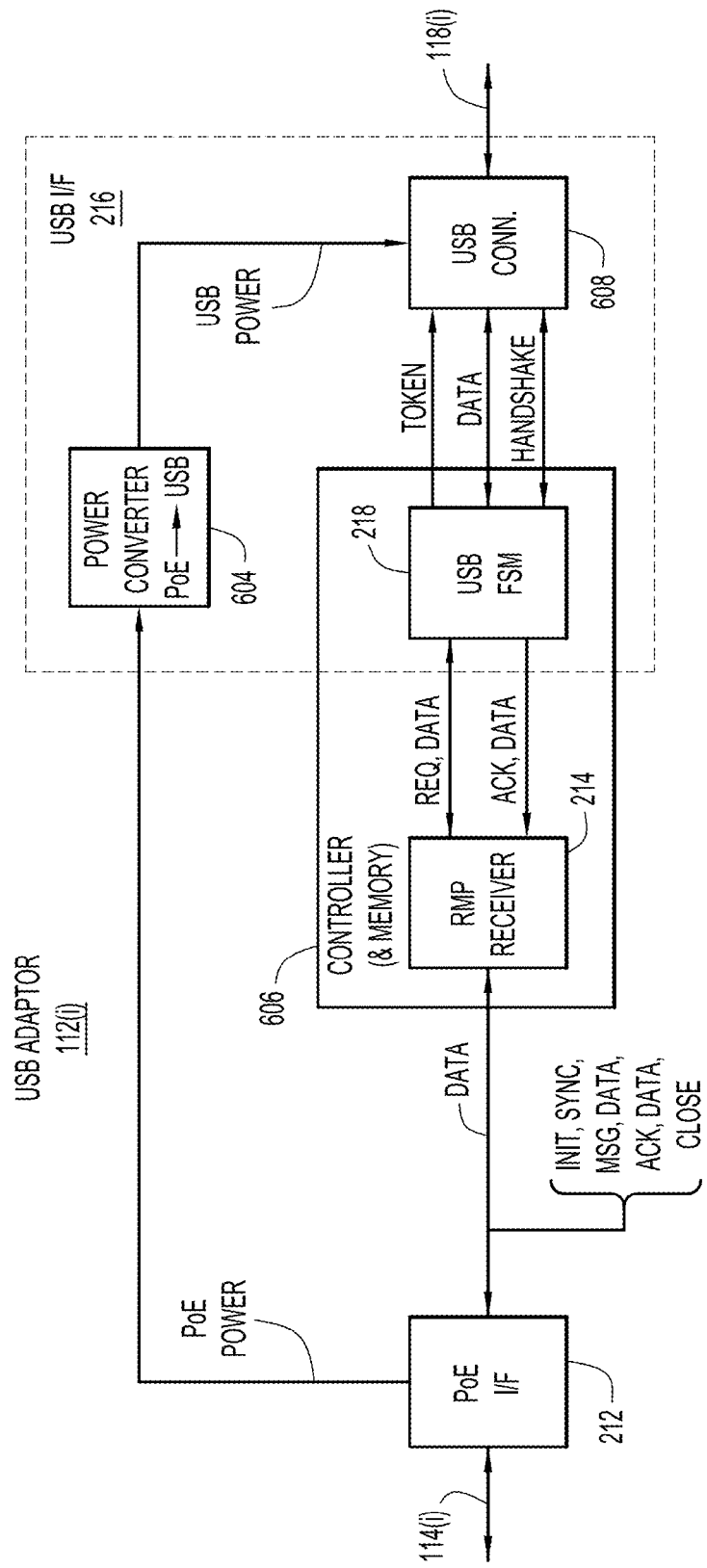
FIG. 6 is a block diagram of example NUSB adaptor configured to perform NUSB adaptor techniques presented herein, according to an example embodiment.

With reference to FIG. 6, there is depicted a block diagram of a given NUSB adaptor 112(i), according to an embodiment. NUSB adaptor 112(i) includes a PoE-USB power converter 604, a USB adaptor controller 606, which includes associated memory, and a USB connector 608 to mate with a USB cable. PoE interface 212 provides PoE power/voltage received over PoE connection 114(i) to power converter 604. Power converter 604 converts the PoE power/voltage to a USB power/voltage suitable for powering USB device 116(i), and provides the USB power/voltage to USB connector 608. In an embodiment, power converter 604 is included in power circuitry 220 of NUSB adaptor 112(i) depicted in FIG. 2, and operates in accordance with the power delivery specification called "USB Powered Device (PD)" to power USB device 116(i).

PoE interface 212 also provides data from/to PoE connection 114(i) to/from USB adaptor controller 606. Controller 606 includes logic to implement RMP Receiver 214 and USB FSM 218, and may be implemented as an FPGA, for example.

USB I/F 216 of NUSB 112(i) depicted in FIG. 2 includes power converter 604 (of power circuitry 220), USB FSM 218, and USB connector 608.

Figure 7:
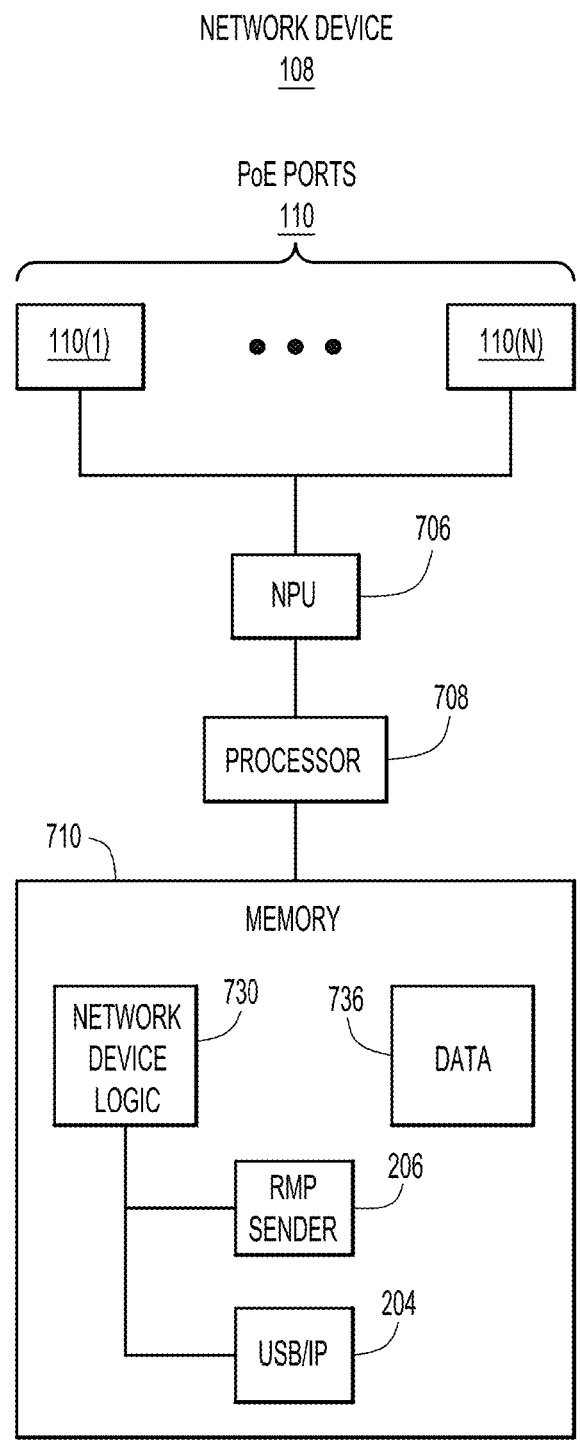
FIG. 7 is a block diagram of a network device configured to perform network device techniques presented herein, according to an example embodiment.

With now reference to FIG. 7, there is shown a block diagram of network device 108 configured to perform the network device techniques presented herein, according to an embodiment. Network device 108 includes PoE-enabled network ports 110 configured to receive data packets from other devices of a network and to send packets to the network, a network processor unit (NPU) 706 for switching packets among the ports, a central processing unit (CPU) 708 (also referred to simply as a "processor" 708), and a memory 710. The processor 708 is, for example, a microprocessor or microcontroller that executes software instructions stored in the memory 710 to perform higher level control of the operations of the network device 108 and NUSB architecture techniques described herein.

Memory 710 may comprise volatile memory (VM) and non-volatile memory (NVM) in various forms, including read only memory (ROM), random access memory (RAM), magnetic disk storage media devices, optical storage media devices, electrical, optical, or other physical/tangible memory storage devices. Thus, in general, the memory 710 may comprise one or more tangible (non-transitory) computer readable storage media (e.g., a memory device) encoded with software comprising computer executable instructions and when the software is executed (by the processor 708) it is operable to perform the techniques described herein. For example, memory 710 stores or is encoded with instructions for Network Device logic 730 to perform operations associated with the NUSB architecture techniques. Logic 730 may include logic to implement RMP Sender 206 and USB/IP server 204. In addition, memory 210 stores data 736 used and generated by the processor 708 when executing the logic 730.

In summary, in one form, a method is provided comprising: at a network device to enable an application program to communicate with a Universal Serial Bus (USB) device through a USB adaptor device having a Power-over-Ethernet (PoE) connection to a PoE port of the network device, and a USB connection to the USB device: establishing a Transmission Control Protocol/Internet Protocol (TCP/IP) connection with the application program; receiving downlink TCP/IP packets carrying USB transaction requests destined for the USB device from the application program over the TCP/IP connection; converting the received downlink TCP/IP packets carrying the USB transaction requests to downlink bus-level USB transactions that are understandable to the USB device; and sending the downlink bus-level USB transactions to the USB adaptor device over the PoE connection for forwarding by the USB adaptor device to the USB device over the USB connection.

In another form, an apparatus is provided comprising: one or more Power-over-Ethernet (PoE) enabled network ports to communicate with a communication network and Universal Serial Bus (USB) devices; and a processor coupled to the PoE network ports, to: establish a Transmission Control Protocol/Internet Protocol (TCP/IP) connection with an application program; receive downlink TCP/IP packets carrying USB transaction requests destined for the USB device from the application program over the TCP/IP connection; convert the received downlink TCP/IP packets carrying the USB transaction requests to downlink bus-level USB transactions that are understandable to the USB device; and cause the downlink bus-level USB transactions to be sent to the USB adaptor device over the PoE connection for forwarding by the USB adaptor device to the USB device over the USB connection.

In yet another form, an apparatus is provided comprising: a Power-over-Ethernet (PoE) interface to receive and transmit Ethernet packets and receive a PoE power voltage; a power converter to convert the PoE power voltage to a Universal Serial Bus (USB) power voltage; a USB connector to mate with a USB device and output the USB power voltage to the connected USB device; and a controller coupled to the PoE interface and the USB connector, to: receive, through the PoE interface, downlink Ethernet packets carrying bus-level USB transaction intended for and understandable by the connected USB device; unwrap the bus-level USB transactions from the downlink Ethernet packets; and convert the unwrapped bus-level USB transactions to a downlink USB transaction sequence to be transmitted to the USB device; and cause the downlink USB transaction sequence to be sent to the USB device through the USB connector.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
  at a network device to enable an application program to communicate with a Universal Serial Bus (USB) device through a USB adaptor device having a Power-over-Ethernet (PoE) connection to a PoE port of the network device, and a USB connection to the USB device:
  establishing a Transmission Control Protocol/Internet Protocol (TCP/IP) connection with the application program;
  receiving downlink TCP/IP packets carrying USB transaction requests destined for the USB device from the application program over the TCP/IP connection;
  converting the received downlink TCP/IP packets carrying the USB transaction requests to downlink bus-level USB transactions that are understandable to the USB device; and
  sending, using a Reliable Message Protocol (RMP), the downlink bus-level USB transactions to the USB adaptor device over the PoE connection for forwarding by the USB adaptor device to the USB device over the USB connection, the sending including encapsulating each downlink bus-level USB transaction in an RMP message and sending the RMP message as an Ethernet packet formatted in accordance with a Network-USB (NUSB) protocol format that includes an Ethernet layer populated with Ethernet parameters, an RMP layer populated with RMP parameters, and a bus-level USB transaction layer populated by bus-level USB transactions.

2. The method of claim 1, further comprising, at the network device:
  receiving, using the RMP, uplink bus-level USB transactions from the USB adaptor device over the PoE connection that originated from the USB device;
  converting the uplink bus-level USB transactions to corresponding uplink TCP/IP packets carrying the uplink bus-level USB transactions; and
  sending the uplink TCP/IP packets carrying the bus-level USB transactions to the application program over the TCP/IP connection.

3. The method of claim 1, wherein the sending using the RMP includes performing a multi-message handshake between an RMP sender implemented in the network device and an RMP receiver implemented in the USB adaptor device over the PoE connection so as to cause:
  opening of an RMP connection between the RMP sender and the RMP receiver;
  sending one or more RMP messages from the RMP sender to the RMP receiver using the RMP connection, wherein each RMP message encapsulates one of the downlink bus-level USB transactions; and
  closing the RMP connection after the RMP messages are sent.

4. The method of claim 3, wherein:
  the multi-message handshake further causes receiving one or more RMP acknowledgement messages before the closing; and
  the receiving using the RMP includes receiving the uplink bus-level USB transactions encapsulated in corresponding ones of the RMP acknowledgement messages.

5. The method of claim 1, wherein:
  the receiving downlink USB transaction requests includes receiving USB read, USB write, and USB control requests; and
  the converting includes converting each of the USB read, USB write, and USB control requests into corresponding ones of the bus-level USB transactions that implement the USB transaction requests, including USB tokens, USB data, USB handshake, and USB special transactions according to a USB standard.

6. The method of claim 5, wherein the USB tokens include IN, OUT, and SETUP tokens according to the USB standard.

7. An apparatus comprising:
  one or more Power-over-Ethernet (PoE) enabled network ports to communicate with a communication network and Universal Serial Bus (USB) devices; and
  a processor coupled to the PoE network ports, to:
    establish a Transmission Control Protocol/Internet Protocol (TCP/IP) connection with an application program;
    receive downlink TCP/IP packets carrying USB transaction requests destined for the USB device from the application program over the TCP/IP connection;
    convert the received downlink TCP/IP packets carrying the USB transaction requests to downlink bus-level USB transactions that are understandable to the USB device; and
    send, using a Reliable Message Protocol (RMP), the downlink bus-level USB transactions to the USB adaptor device over the PoE connection for forwarding by the USB adaptor device to the USB device over the USB connection, wherein the send operation includes encapsulating each downlink bus-level USB transaction in an RMP message and sending the RMP message as an Ethernet packet formatted in accordance with a Network-USB (NUSB) protocol format that includes an Ethernet layer populated with Ethernet parameters, an RMP layer populated with RMP parameters, and a bus-level USB transaction layer populated by bus-level USB transactions.

8. The apparatus of claim 7, wherein the processor:
  receives, using the RMP, uplink bus-level USB transactions from the USB adaptor device over the PoE connection that originated from the USB device;
  converts the uplink bus-level USB transactions to corresponding uplink TCP/IP packets carrying the uplink bus-level USB transactions; and
  causes the uplink TCP/IP packets to be sent carrying the bus-level USB transactions to the application program over the TCP/IP connection.

9. The apparatus of claim 7, wherein the processor causes the uplink packets to be sent using the RMP by performing a multi-message handshake between an RMP sender implemented in the network device and an RMP receiver implemented in the USB adaptor device over the PoE connection so as to cause:
  opening of an RMP connection between the RMP sender and the RMP receiver;
  causing one or more RMP messages to be sent from the RMP sender to the RMP receiver using the RMP connection, wherein each RMP message encapsulates one of the downlink bus-level USB transactions; and
  closing the RMP connection after the RMP messages are sent.

10. The apparatus of claim 9, wherein:
  the multi-message handshake further causes receiving one or more RMP acknowledgement messages before the closing; and
  the processor receives, using the RMP, the uplink bus-level USB transactions encapsulated in corresponding ones of the RMP acknowledgement messages.

11. The apparatus of claim 7, wherein:
  the processor receives USB read, USB write, and USB control requests; and the processor converts each of the USB read, USB write, and USB control requests into corresponding ones of the bus-level USB transactions that implement the USB transaction requests, including USB tokens, USB data, USB handshake, and USB special transactions according to a USB standard.

12. The apparatus of claim 11, wherein the USB tokens include IN, OUT, and SETUP tokens according to the USB standard.

13. An apparatus comprising:
a Power-over-Ethernet (PoE) interface to receive a PoE power voltage, and receive and transmit Ethernet packets formatted in accordance with a Network-Universal Serial Bus (NUSB) protocol format that defines (i) an Ethernet layer including fields populated with Ethernet parameters, (ii) a Reliable Message Protocol (RMP) layer including fields populated with RMP parameters, and (iii) a bus-level USB transaction layer including fields populated with bus-level USB transactions;
a power converter to convert the PoE power voltage to a Universal Serial Bus (USB) power voltage;
a USB connector to mate with a USB device and output the USB power voltage to the connected USB device; and
a controller coupled to the PoE interface and the USB connector, to:
receive, through the PoE interface using the RMP, downlink Ethernet packets carrying bus-level USB transaction intended for and understandable by the connected USB device;
unwrap the bus-level USB transactions from the downlink Ethernet packets; and
convert the unwrapped bus-level USB transactions to a downlink USB transaction sequence to be transmitted to the USB device; and
send the downlink USB transaction sequence to the USB device through the USB connector.

14. The apparatus of claim 13, wherein the controller further:
receives an uplink bus-level USB transaction sequence from the USB device through the USB connector;
converts the USB transaction sequence into bus-level USB transactions; and
uses the RMP to cause the bus-level USB transactions to be transmitted in Ethernet packets through the PoE interface.

15. The apparatus of claim 14, wherein the controller uses the RMP as a sender-side RMP to both transmit and receive Ethernet packets.

16. The apparatus of claim 13, wherein the controller uses the RMP by performing a multi-message handshake between an RMP receiver and an RMP sender connected to the controller through the Ethernet interface, to:
open of an RMP connection between the RMP sender and the RMP receiver;
cause one or more RMP messages to be sent from the RMP sender to the RMP receiver using the RMP connection, wherein each RMP message encapsulates one of the bus-level USB transactions; and
close the RMP connection after the RMP messages are sent.

17. The apparatus of claim 13, wherein the bus-level USB transactions include USB tokens, USB data, USB handshake, and USB special transactions according to a USB standard.

18. The apparatus of claim 17, wherein the USB tokens include IN, OUT, and SETUP tokens according to the USB standard.

19. The method of claim 1, wherein the Ethernet parameters include destination and source Media Access Control (MAC) addresses, and an ethertype.

20. The method of claim 1, wherein the RMP parameters include an encapsulation protocol version, INIT, SYNC, MSG, and ACK parameters, and sender and receiver sequence numbers.

21. The apparatus of claim 7, wherein the Ethernet parameters include destination and source Media Access Control (MAC) addresses, and an ethertype.

22. The apparatus of claim 7, wherein the RMP parameters include an encapsulation protocol version, INIT, SYNC, MSG, and ACK parameters, and sender and receiver sequence numbers.

23. The apparatus of claim 13, wherein the Ethernet parameters include destination and source Media Access Control (MAC) addresses, and an ethertype.

24. The apparatus of claim 13, wherein the RMP parameters include an encapsulation protocol version, INIT, SYNC, MSG, and ACK parameters, and sender and receiver sequence numbers.

* * * * *